Figure 1:
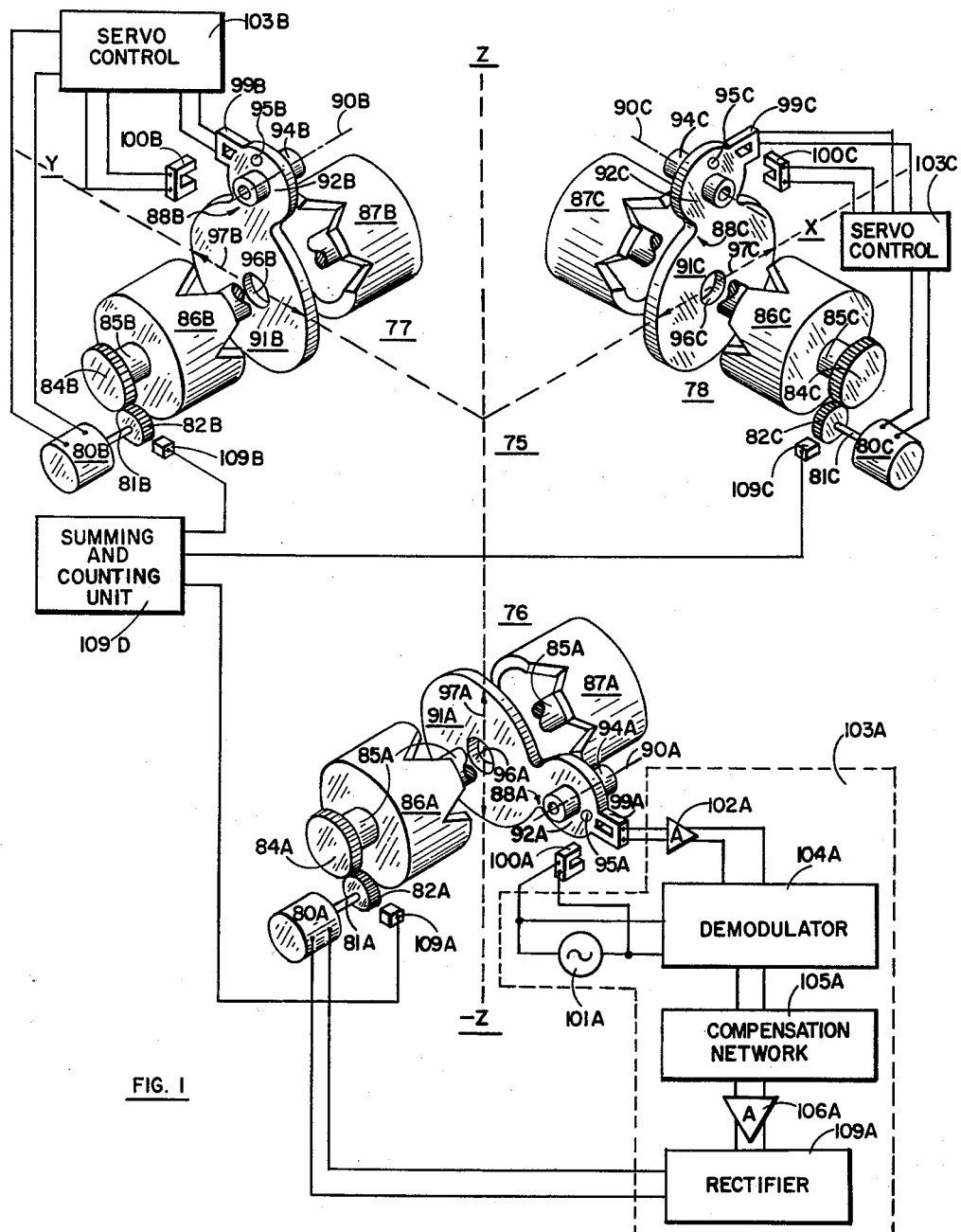

Nov. 6, 1962  J. M. SLATER ETAL  3,062,051
PORTABLE GRAVIMETER

Filed Aug. 29, 1958  2 Sheets-Sheet 2

INVENTORS.
JOHN M. SLATER
WALTER L. PONDROM
BY DOYLE E. WILCOX

ATTORNEY 3,062,051
PORTABLE GRAVIMETER
John M. Slater, Fullerton, and Doyle E. Wilcox, Puente, Calif., and Walter L. Pendrom, Houston, Tex., assignors to North American Aviation, Inc.
Filed Aug. 29, 1958, Ser. No. 758,071
5 Claims. (Cl. 73—382)

This invention relates to means for measuring accelerations and particularly to a readily portable improvement in gravimeters or devices for measuring the acceleration of gravity, of types which may be used in geophysical prospecting.

The invention is particularly concerned with gravimeters utilizing forces of readily and accurately determinable magnitudes to balance the gravitational forces to be measured. Such forces may be of gyroscopic or centrifugal force origin, for example. More specifically, the invention employs, in one embodiment, forces produced by induced eddy-currents reacting with a magnetic field to balance the force due to the acceleration of gravity.

A gravimeter is a sensitive device for measuring the magnitude of the acceleration of gravity, $g$. It is used in geophysical prospecting to detect anomalies or local variations in the magnitude of $g$, which give evidence of the existence and nature of particular subterranean geological structures. For example, in the thick silt beds along the coast of the Gulf of Mexico there exist buried salt domes which are often associated with oil. The domes may give no indication of their presence visible at the surface, yet, due to the difference in density between the salt and silt deposits, a gravitational anomaly may exist which can be detected by sensitive instruments. The value of $g$ may be higher, or lower, than the average over the adjacent areas, depending on the relative densities. The anomalies of interest are extremely small, of the order of 1 part in $10^6$ to 1 part in $10^7$, of the normal value, which at sea level is about 980 centimeters per second per second.

The magnitude of $g$ is a function of the distance R from the center of the earth, which may be expressed in terms of the altitude $h$ above a datum. Variations in measured $g$ which are due merely to variations in R or $h$ must be distinguished from those due to gravitational anomalies. Hence, R must be known to the same proportional accuracy as the intended $g$ measurement. This requires that $h$ be determined with an accuracy of the order of a few feet. In practice $h$ is determined by surveying or by a highly refined technique based on the use of the aneroid barometer.

While extraordinary accuracy is required of the gravimeter so far as resolution and drift are concerned, absolute values of $g$ are of less importance. Typically, a number of observations will be carried out along a line or in an area to develop a profile. Periodically, the gravimeter will be checked against a central station of known $g$ and $h$. Drift between checks is assumed to be linear with time and the field data are corrected accordingly.

The most accurate gravity measuring method hitherto known was based on the pendulum. A pendulum, typically a metal ring hanging on a knife edge, is set to swinging and the period T is measured, to find $g$ from the expression:

$$T = 2\pi \sqrt{\frac{I}{mgr}} \tag{1}$$

which may be rewritten as:

$$g = \frac{4\pi^2 I}{mrT^2} \tag{2}$$

where $mr$ is the pendulous moment and I is moment of inertia. This is an absolute method, the measurement of $g$ being determined by the quantities, mass, length, and time, as distinguished from values of electrical currents, spring compliances and the like.

Pendulums of practical size have periods of the order of a second. Thus the measurement is very time-consuming when variations of the indicated order, 1 part in $10^7$, are concerned. This figure corresponds to a gain or loss of only one swing in 115 days, in a seconds pendulum. Ways have been devised to count parts of a swing, but nothing that is very convenient for field use has been developed. Attempts have been made to produce short-period pendulums: one such effort, for example, utilized a tiny pendulum mounted as a movable electrode in an electronic vacuum tube. Devices using a mass-loaded vibratory reed have also been suggested. In general, however, accuracy goes down with size, since pivot friction and other sources of disturbance cannot be reduced proportionally to the moment of inertia of the pendulum. Accordingly, as a gravity measuring device, the pendulum is ordinarily restricted to central station use.

Gravimeters for field use have been developed which have the form of a spring-supported mass, deflections of the spring being taken as a measure of variations in $g$. Readings may be made very quickly. Such a device is not an absolute instrument, the measurement being dependent upon the elastic properties of the particular spring. However, by proper care in choice of spring materials and in manner of operation, drift can be kept to very low values—of the order of 1 part in $10^6$ per day. As deflections are very small, a high resolution pickoff is required.

The spring-mass gravimeters of types presently in use are of limited utility on bases subject to horizontal accelerations, due to the nature of the suspension. This, in general, takes the form of a helical spring support or a torsion filament support, with little or no lateral restraint. Elaborate and delicate caging mechanisms have been developed, in an attempt to protect the suspension from shock damage without introducing a "set" or bias of the spring.

Both the pendulum and the spring-supported types of gravimeters are primarily adapted for use on fixed bases. Gravity measurements have been made on ships, however, using a pickoff operating between a pair of pendulums rather than between the pendulum and base. The fact that a pendulum is an integrating device may be seen from the equation:

$$N = k\int \sqrt{g} \, dt \tag{3}$$

where N is the number of swings. This helps in nullifying the effect of short-period disturbances due to rolling and pitching, through the non-linear nature of the output, a quadratic, is a drawback under such conditions.

The gravimeters of the present invention preferably make use of a special kind of hydrodynamic bearing for the support of the proof mass, that is, the physical element which senses $g$. In the art of inertial guidance, the problem existed of providing supports for the gimbals of gyroscopes, accelerometers and the like which would be capable of withstanding substantial loads in any direction, yet would be characterized by extremely low friction, and free from other sources of disturbing torques. Pressure-fed journal bearings of liquid and gas types, for example, were developed for such usages, and have the required properties to a high degree. Uncertainty torque is extremely low, load-carrying capacity is high, and the size is small. Rugged, sensitive instruments are made possible which are small and simple enough to be operated even in narrow well bores.

This type of bearing defines an axis accurately, and so assists in making feasible force-balancing arrangements such as those described herein. Successful operation of such devices would be very difficult to achieve using torsion-wire or other supports which do not fix an axis of rotation accurately. Also, with this type of bearing, operation in an inclined position is feasible. Hence, it is possible to use an assembly of three instruments, disposed with their sensitive axes at right angles to each other, to measure g without having to level the device. Bearings of the necessary characteristics were described in the pending application of John M. Slater et al., filed September 1, 1954, Serial No. 453,566, for a "Gas Bearing Gyroscope" and that of Joseph F. Acterman, Serial No. 607,220, filed August 30, 1956, now U.S. Patent No. 2,899,243, for an "Autolubricated Gas Thrust Bearing," both having a common assignee with the instant application.

The gravimeters to be described hereafter are of the integrating type, and specific embodiments shown, will be referred to generally as being of the eddy-current induction type.

The structure of the present invention, in which forces due to readily measurable accelerations are balanced against that of gravity, has for its primary object the improvement of the construction, and the practicability for field use, of gravimeters.

It is therefore an object of the present invention to provide a gravimeter of an integrating type arranged to permit an accurate measurement in a relatively short length of time.

It is another object to provide an instrument in which g is measured by counting a periodic output signal of relatively high frequency.

It is still another object to provide an integrating type gravimeter in a form useful on a moving base.

Yet another object is to provide a gravimeter in a form resistant to shock damage in transportation.

It is a still further object to provide a gravimeter in which the proof mass is supported in such manner as to withstand substantial accelerations, in addition to g, in any direction.

It is a further object to provide a gravimeter in a form in which the magnitude of g can be determined accurately without requiring careful leveling of the unit.

It is still another object to provide a gravimeter capable of making measurements in deep wells or at the ocean floor.

Figure 2:
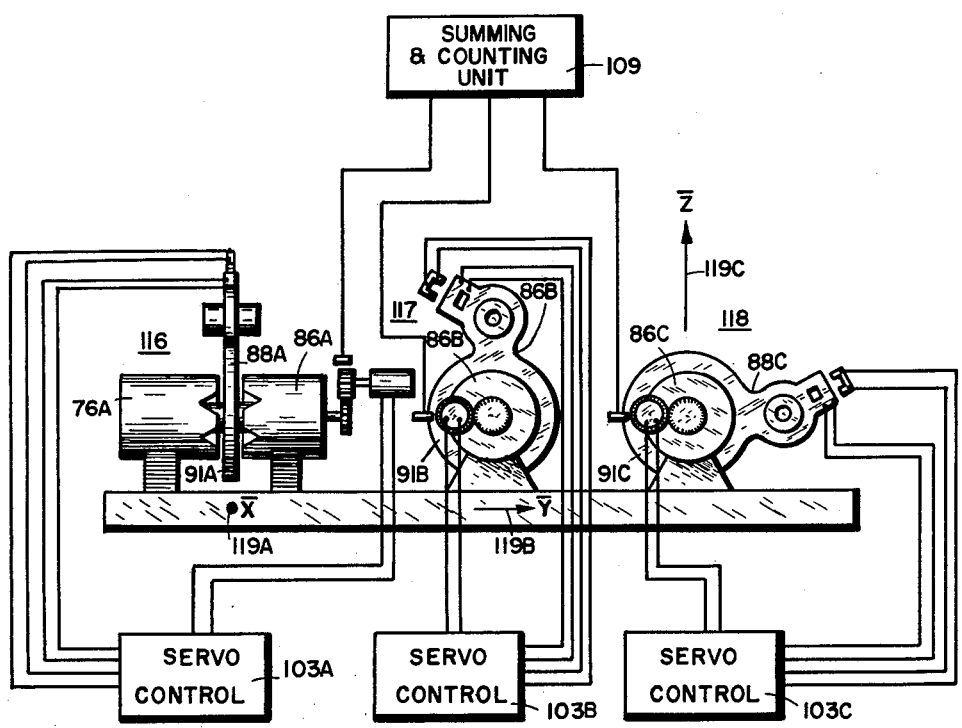

Further objects of this invention will become apparent from the following description taken in connection with the accompanying drawings, in which:

FIG. 1 is a schematic exploded view of a preferred embodiment of the invention utilizing forces due to induced eddy-currents to balance the gravitational forces on a pendulous mass and incorporated in an assembly adapted to operation without requiring leveling; and FIG. 2 is an alternative embodiment of the invention, in schematic side view.

In the drawings like numerals refer to like parts.

A preferred form of the invention free from the necessity of leveling before use is illustrated schematically in FIG. 1. Here three eddy-current type sensing units housed in a conventional case, not shown, are employed in combination, with their sensitive axes mutually perpendicular. This enables the device to be used more readily as a field instrument, since it is accurately able to function at all times. The assembly may be lowered into a well bore, for example, and readings made on suitable instruments at the surface connected conventionally to the units. This embodiment of the invention utilizes the forces produced by induced eddy-currents to balance the force due to gravity. Each of the three sensing units utilized is similar in concept to that disclosed in the patent application entitled "Inertial Velocity Meter," filed jointly by J. M. Slater with Doyle E. Wilcox, Darwin L. Freebairn, Jr. and Walter L. Pondrom, Jr., under Serial No. 575,668, on April 2, 1956. The gravity components measured by the three instruments are vectorially summed to get the proper value of g.

In the movable unit assembly, indicated generally as 75, a first sensing device 76 is positioned to respond to acceleration components along axis 97A (in the xy plane). A second sensing device 77 responds to acceleration components along axis 97B (in the xz plane) normal to axis 97A, and a third sensing device 78 responds to acceleration along axis 97C (in the yz plane) normal to both 97A and 97B. In the particular apparatus configuration illustrated, the pendulum pivot axes are likewise disposed along a set of orthogonal axes 90A, B, C; though other configurations of the pivot axes are equally practical provided the required orthogonality of sensing axes 97A, B, C is maintained. It is not essential that the pivotal axes be located as described, as long as the sensitive axes or directions are so oriented. In each of the measuring instruments the component parts of the equipment employed are identical. They have been referred to by the same reference numerals followed by an appropriate designating letter. For example, each of these sensing device incorporates a rotary servo motor. That used in conjunction with the first sensing device 76 is designated as 80A; and that used in conjunction with the second sensing device 77 is designated 80B; while that used in conjunction with the third sensing device 78 is designated 80C. In the first sensing device 76, rotary servo motor 80A turns, thru a drive shaft 81A, a drive gear 82A and meshing driven gear 84A, and a magnet drive shaft 85A carrying a pair of spaced multi-pole magnets 86A and 87A. In the exploded view showing of FIG. 1 these magnets are separated substantially for ease in understanding. In the actual embodiment, they are disposed in close proximity to the disk portion of the proof mass, with the portions of one polarity on magnets 86A alined with those of the opposite polarity on magnet 87A. The proof mass is a counter-balanced pivotally mounted low inertia member indicated generally as 88A. Proof mass 88A is eccentrically mounted for rotation about the axis 90A, and is, therefore, subjected to a torque about axis 90A under acceleration. The proof mass 88A utilizes an eddy-current disk 91A, suitably counterweighted and mounted on an anti-friction bearing for pivoting about axis 90A. The eddy-current disk 91A is made of copper, aluminum or some other conductive material which is preferably not magnetic in nature. The magnetic flux variations therein due to rotation of magnets 86A and 87A is utilized as described hereafter. The disk is connected to a mounting hub 92A fixed about a low friction bearing 94A for pivotal movement about its axis 90A. Counterweight 95A is inserted in the hub 92A opposite the eddy-current disk 91A for adjustment of the pendulousity of the proof mass 88A. Disk 91A has a central bore 96A through which magnet drive shaft 85A passes. Bore 96A is a few hundredths of an inch larger in diameter than the shaft 85A. Oscillation through a small arc about axis 90A is thus permitted when the disk is subjected to accelerations along the sensitive axis 97A. The direction of sensitive axis 97A is orthogonal to the plane containing the axis 90A and the center of mass of the proof mass 88A.

A pickoff unit is associated with hub portion 92A. Pickoff 99A having a flat-wound, or pancake, coil is connected to the hub 92A of pivotal mass 88A. The electromagnetic element 100A, a C-shaped armature having a pair of oppositely wound coils, cooperates therewith. The electromagnetic element 100A is excited by A.-C. source 101A. After an initial adjustment, the pancake coil of the pickoff 99A lies symmetrically in the field of electromagnetic element 100A. Hence no output signal is sent to amplifier 102A of the servo control circuitry, generally designated as 103A. Upon any deflection of pivotal mass 88A, such as is caused by an acceleration in the sensitive direction, pickoff coil 99A moves with respect to element 100A, and a voltage is induced which is received at amplifier 102A. If coil 99A deflects in one direction with respect to element 100A, amplifier 102A receives a signal in a particular phase. If coil 99A deflects in the opposite direction with respect to electromagnetic element 100A, amplifier 102A receives a signal of the opposite phase.

Phase-sensitive demodulator 104A receives the output of amplifier 102A and also the output of A.-C. source 101A to provide a D.-C. output signal which varies in accordance with the deflection of pivotal mass 88A. By reason of the low friction mounting and the low inertia of mass 88A, pickoff frequencies up to several hundred cycles per second may be received for demodulation by demodulator 104A. A frequency compensation network 105A is connected to receive the output of demodulator 104A. The output signal from network 105A passes first through A.-C. magnetic amplifier 106A, next through phase-synchronized rectifier 107A, and is then applied to motor 80A, which in this case is a D.-C. motor. Amplifier 106A and rectifier 107A may be replaced with a D.-C. amplifier having a reversible output. Motor 80A rotates, therefore, according to deflections of mass 88A, and causes multipole magnets 86A and 87A to spin rapidly and induce eddy-currents in disk 91A. These currents provide a force couple tending to restore mass 88A to an undeflected position. Due to the quick time response of motor 80A, mass 88A will be maintained substantially in an undeflected position. Only a small fraction of an inch is required for clearance of the bore 96A relative to the shaft 85A which passes therethrough. At the moderate speeds, a few revolutions per second, which prevail in use, the force couple, or drag, developed on disk 91A is directly proportional to the speed of the magnets.

Compensation network 105A and the various other elements of the circuit 103A form a closed loop servo control system which is designed according to well-known principles of servomechanisms. Network 105A is designed particularly to provide suitable gain at the lower frequencies in order to provide suitable response and stability to the servo system. In certain design instances, network 105A may not be required in order to obtain stability. A suitable pickoff unit 109A is connected to provide an input to a conventional summing and counting unit 109D, which counts the rotations of D.-C. motor 80A and sums this value vectorially with values received from similar units associated with the other sensitive axes to obtain the correct value of g.

With this embodiment, although normally not necessary, suitable velocity damping means might be used to reduce the sensitivity to accelerations at high frequencies. For example, increasing the viscosity of flotation fluid or the moment of inertia of the pendulum would act to reduce the sensitivity to high frequency accelerations. Deflections of lower frequencies are kept to a minimum by the response of motor 80A, and deflections of the higher frequencies may be kept to a minimum by the damping device, if necessary.

There are, therefore, in the embodiment illustrated, two closed loop servo circuits. The speed of rotation of motor 80A is an indication of the component of the total acceleration including gravity and any other acceleration to which the instrument is subjected, along the sensitive axis or direction 97A. The shaft position of motor 80A is an indication of the time integral of this acceleration. It will be readily apparent that this device can be operated in any position and hence is particularly suited to use on a moving platform, or in situations such as a deep well bore, where the device cannot readily be leveled.

Another embodiment of the invention is shown schematically in FIG. 2, in which three sensing instruments 116, 117 and 118, each of the same sort as the units 76, 77 and 78 illustrated in FIG. 1, are set up in a row. Arrows 119A, 119B and 119C indicate the sensitive directions for the proof masses 91A, 91B and 91C, respectively.

The showing of the remainder of the associated equipment and circuitry is omitted, since it may be identical with that of FIG. 1. It will be apparent that the positions of the sensing elements may be varied widely, subject only to the limitation that the sensitive axes shall be mutually perpendicular.

Although the invention has been described and illustrated in detail, it is to be clearly understood that the same is by way of illustration and example only and is not to be taken by way of limitation, the spirit and scope of this invention being limited only by the terms of the claims.

We claim:

1. An integrating type of instrument for measuring the acceleration of gravity, having three sensing assemblies operating along three mutually perpendicular sensitive axes, each comprising: a proof mass; means for constraining said mass against movement except along one sensitive axis; pickoff means for sensing movement along said sensitive axis; servo means responsive to said pickoff means and arranged to resist movement along said sensitive axis through the generation of a periodic function proportional to the applied force; said servo means including a servo motor and magnet means rotated by said servo motor, said magnet means being disposed next to a conducting portion of said proof mass; said pickoff means signalling the servo means to rotate the magnet means in a sense to oppose said movement along said sensitive axis by the generation of eddy-currents in the proper direction in said proof mass; and means for summing such rotations as a measure of the force of gravity.

2. A gravimeter adapted for operation without requiring preliminary leveling, comprising the combination of: three sensing assemblies of the type described in claim 1; means for obtaining the individual magnitudes of the components of the force of gravity indicated by each of the said assemblies; and means for summing vectorially the magnitudes of said individual components of the force of gravity to obtain an exact measure of the force of gravity.

3. In a gravimeter adapted for operation without requiring preliminary leveling, the combination of: three sensing instruments having their sensitive axes mutually perpendicular, each of said instruments having a motor, a magnetic element adapted to be driven by said motor so as to produce a rotating magnetic field, a proof mass pivotally mounted for movement about an axis and having a conductive member disposed in the field of said magnetic element so that on rotation of said magnetic element, eddy-current drag forces are established on said conductive member, pickoff means located to sense the movement of each of said proof masses, servo means for controlling the speed of said motor in accordance with signals from said pickoff means, means for determining the number of revolutions per unit of time for each of said motors to maintain null deflection of each of said proof masses about the sensitive axis thereof; and means for summing vectorially the rates of rotation of each of said motors to obtain an exact measure of the acceleration of gravity.

4. A gravimeter operable in any position, comprising three sensing units, each having a single axis of sensitivity, and disposed with these axes mutually perpendicular; each of said sensing units having a proof mass supported for movement solely along one of said sensitive axes, said proof mass having an apertured conducting member, a rotatably mounted shaft extending through said apertured conducting member, magnet means mounted in polarity opposition on said shaft on opposite sides of and adjacent said conducting member, servomotor means for driving said rotatable shaft, pickup means arranged to sense departures of said proof mass from a null position, circuitry for energizing said servomotor means to produce rotation thereof proportional to the departure of said proof mass from said null position; means for measuring the force necessary to restore said proof mass to null position as a component of the force of gravity; and means for summing the measured components along said mutually perpendicular axes to obtain the absolute value of gravity.

5. In an integrating type sensing instrument for measuring the acceleration of gravity: a support; a first pendulous proof mass eccentrically mounted relative to said support on a pivotal axis for pivotal motion in a plane containing a first of three mutually orthogonal sensing axes, said proof mass having a centrally-bored eddy current disk; motor means fixed relative to said support; a rotatable shaft driven by said motor means and extending through said centrally bored disk parallel to and radially displaced from said pivotal axis; a pair of mutually spaced multipole magnets fixed on said shaft and disposed on opposite sides of said disk; pickoff means for sensing angular movement of said pendulous proof mass about said pivotal axis; servo means responsively connected to said pickoff means for energizing said motor means, whereby said shaft and magnets are rotatably driven in a sense to oppose angular motion of said proof mass about said pivotal axis by magnetomotive forces resulting from eddy currents thereby induced in said eddy current disk; a second and third proof mass with like associated elements arranged substantially as said first proof mass, said second and third proof mass being similarly oriented relative to second and third sensing axes, respectively, of said three mutually orthogonal axes; and means for vectorially summing the rotation of the respective motor means cooperating with each said proof mass as a measure of the force of gravity.

References Cited in the file of this patent

UNITED STATES PATENTS

| | | |
|---|---|---|
| 2,338,732 | Nosker | Jan. 11, 1944 |
| 2,377,212 | Cottrell | May 29, 1945 |
| 2,529,619 | Maney | Nov. 14, 1950 |
| 2,710,942 | Emerson | June 14, 1955 |